(12) United States Patent
Katsuki et al.

(10) Patent No.: US 10,488,928 B2
(45) Date of Patent: Nov. 26, 2019

(54) TACTILE SENSATION PROVIDING SYSTEM AND TACTILE SENSATION PROVIDING APPARATUS

(71) Applicant: FUJITSU LIMITED, Kawasaki-shi, Kanagawa (JP)

(72) Inventors: Takashi Katsuki, Isehara (JP); Fumihiko Nakazawa, Kawasaki (JP); Osamu Toyoda, Akashi (JP); Akihiko Yabuki, Isehara (JP)

(73) Assignee: FUJITSU LIMITED, Kawasaki (JP)

(*) Notice: Subject to any disclaimer, the term of this patent is extended or adjusted under 35 U.S.C. 154(b) by 226 days.

(21) Appl. No.: 15/609,831

(22) Filed: May 31, 2017

(65) Prior Publication Data

US 2017/0262060 A1     Sep. 14, 2017

Related U.S. Application Data

(63) Continuation of application No. PCT/JP2014/082238, filed on Dec. 5, 2014.

(51) Int. Cl.
*G06F 3/01* (2006.01)
*G06F 3/038* (2013.01)
(Continued)

(52) U.S. Cl.
CPC ............. *G06F 3/016* (2013.01); *G06F 3/014* (2013.01); *G06F 3/038* (2013.01); *G06F 3/041* (2013.01); *G06F 3/0488* (2013.01)

(58) Field of Classification Search
CPC .......... G06F 3/016; G06F 3/014; G06F 3/041; G06F 3/038; G06F 3/011; G06F 3/0416; G06F 3/0426; G06F 3/0488; G09B 5/065
(Continued)

(56) References Cited

U.S. PATENT DOCUMENTS 4,414,537 A * 11/1983 Grimes ................ A61B 5/1114
                                              341/20
5,119,709 A *  6/1992 Suzuki .................. G10H 1/053
                                              84/600
(Continued)

FOREIGN PATENT DOCUMENTS

JP    2009-301094    12/2009
JP    2010-250750    11/2010
(Continued)

OTHER PUBLICATIONS

Patent Abstracts of Japan of JP 2010-250750, published Nov. 4, 2010.
(Continued)

*Primary Examiner* — Fred Tzeng
(74) *Attorney, Agent, or Firm* — Staas & Halsey LLP

(57) ABSTRACT

A tactile sensation providing system includes an electronic device and a tactile sensation providing apparatus, which includes a wearable part worn on fingers, vibrating elements disposed at portions corresponding to the fingers, sensors that detect touches of the fingers onto a manipulation input surface, and a second controlling part able to communicate with a first controlling part. Upon receiving from the second controlling part a signal representing that a touch of one finger is detected by one sensor, the first controlling part obtains, based on data representing the finger and on coordinates detected by a detector, a type of the finger touching the surface and the coordinates where the finger touches the surface, and generates a driving signal representing a tactile sensation corresponding to the data representing the finger, the coordinates, and a displayed image. The second controlling part drives one of the vibrating elements using the driving signal.

8 Claims, 10 Drawing Sheets

(51) Int. Cl.
*G06F 3/041* (2006.01)
*G06F 3/0488* (2013.01)

(58) Field of Classification Search
USPC .......................................................... 345/173
See application file for complete search history.

(56) References Cited

U.S. PATENT DOCUMENTS

| | | | | |
|---|---|---|---|---|
| 5,338,891 | A * | 8/1994 | Masubuchi | G10H 1/0558 84/600 |
| 5,571,020 | A * | 11/1996 | Troudet | G09B 5/065 2/160 |
| 6,088,017 | A * | 7/2000 | Tremblay | G06F 3/011 345/156 |
| 6,380,923 | B1 * | 4/2002 | Fukumoto | G06F 1/163 341/22 |
| 6,734,349 | B1 * | 5/2004 | Adams | G10D 13/003 84/315 |
| 7,012,593 | B2 * | 3/2006 | Yoon | G06F 3/014 340/407.1 |
| 7,381,884 | B1 * | 6/2008 | Atakhanian | G10H 1/34 84/477 R |
| 7,842,879 | B1 * | 11/2010 | Carter | G10H 3/143 84/600 |
| 9,104,271 | B1 * | 8/2015 | Adams | G06F 3/0426 |
| 9,600,072 | B2 * | 3/2017 | Naidu | G06F 3/016 |
| 2005/0052412 | A1 * | 3/2005 | McRae | A63F 13/06 345/158 |
| 2006/0139175 | A1 * | 6/2006 | Cosier | G06K 7/10891 340/572.8 |
| 2008/0055248 | A1 * | 3/2008 | Tremblay | G06F 3/011 345/158 |
| 2008/0120029 | A1 * | 5/2008 | Zelek | G01C 21/20 701/469 |
| 2009/0126554 | A1 * | 5/2009 | Xu | G10H 1/24 84/610 |
| 2010/0134327 | A1 * | 6/2010 | Dinh | G06F 3/014 341/20 |
| 2010/0238005 | A1 * | 9/2010 | White | G08B 6/00 340/407.2 |
| 2011/0007035 | A1 * | 1/2011 | Shai | G06F 3/014 345/179 |
| 2011/0132181 | A1 * | 6/2011 | Kockovic | G10H 1/34 84/723 |
| 2011/0210931 | A1 * | 9/2011 | Shai | G06F 3/014 345/173 |
| 2011/0234483 | A1 * | 9/2011 | Lan | G06F 3/014 345/156 |
| 2011/0285667 | A1 * | 11/2011 | Poupyrev | G06F 3/016 345/174 |
| 2012/0068967 | A1 | 3/2012 | Toubiana et al. | |
| 2012/0154325 | A1 * | 6/2012 | Ueno | G06F 3/0416 345/174 |
| 2012/0154329 | A1 * | 6/2012 | Shinozaki | G06F 3/016 345/174 |
| 2012/0327006 | A1 * | 12/2012 | Israr | G06F 3/016 345/173 |
| 2013/0135223 | A1 * | 5/2013 | Shai | G06F 3/014 345/173 |
| 2013/0218456 | A1 * | 8/2013 | Zelek | G01C 21/3652 701/412 |
| 2014/0139327 | A1 * | 5/2014 | Bau | G06F 3/016 340/407.1 |
| 2014/0146012 | A1 | 5/2014 | Toubiana et al. | |
| 2014/0210601 | A1 * | 7/2014 | Sato | G06F 3/041 340/407.2 |
| 2014/0316309 | A1 * | 10/2014 | Seo | A61H 23/02 601/46 |
| 2015/0002477 | A1 * | 1/2015 | Cheatham, III | G06F 3/016 345/177 |
| 2015/0003204 | A1 * | 1/2015 | Cheatham, III | G06F 3/016 367/93 |
| 2015/0027297 | A1 * | 1/2015 | Avitabile | G09B 15/003 84/470 R |
| 2015/0103017 | A1 * | 4/2015 | Kato | G06F 3/016 345/173 |
| 2015/0123775 | A1 * | 5/2015 | Kerdemelidis | G08B 6/00 340/407.1 |
| 2015/0317910 | A1 * | 11/2015 | Daniels | G16H 20/30 84/485 R |

FOREIGN PATENT DOCUMENTS

| | | |
|---|---|---|
| JP | 2012-503244 | 2/2012 |
| WO | WO 2010/032223 A1 | 3/2010 |
| WO | WO 2010/130632 A2 | 11/2010 |
| WO | WO 2014/061206 A1 | 4/2014 |

OTHER PUBLICATIONS

Espacenet Bibliographic data, Japanese Publication 2009-301094 published Dec. 24, 2009.
Patentscope English Abstract of WO 2014/061206 A1, published Apr. 24, 2014.
International Search Report dated Feb. 3, 2015 in corresponding International Application No. PCT/JP2014/082238.
Takeyuki Dohda et al., "The Printed-matter Typecasting Method for Haptic Feel Design and Sticky-band Illusion", the Collection of papers of the 11th SICE system integration division annual conference (SI2010, Sendai), Dec. 2010, pp. 174 to 177.
Masashi Nakatani et al., "The Fishbone Tactile Illusion", Collection of papers of the 10th Congress of the Virtual Reality Society of Japan, Sep. 2005.

\* cited by examiner

FIG.4A

| SENSOR | ID | VIBRATING ELEMENT |
|---|---|---|
| 330A | s01 | 320A |
| 330B | s02 | 320B |
| 330C | s03 | 320C |
| 330D | s04 | 320D |
| 330E | s05 | 320E |

FIG.4B

| IMAGE ID | img01 | img02 | ... |
|---|---|---|---|
| COORDINATES | C1(X, Y) | C2(X, Y) | ... |
| DRIVING SIGNAL | D1(A1, f1) | D2(A2, f2) | ... |

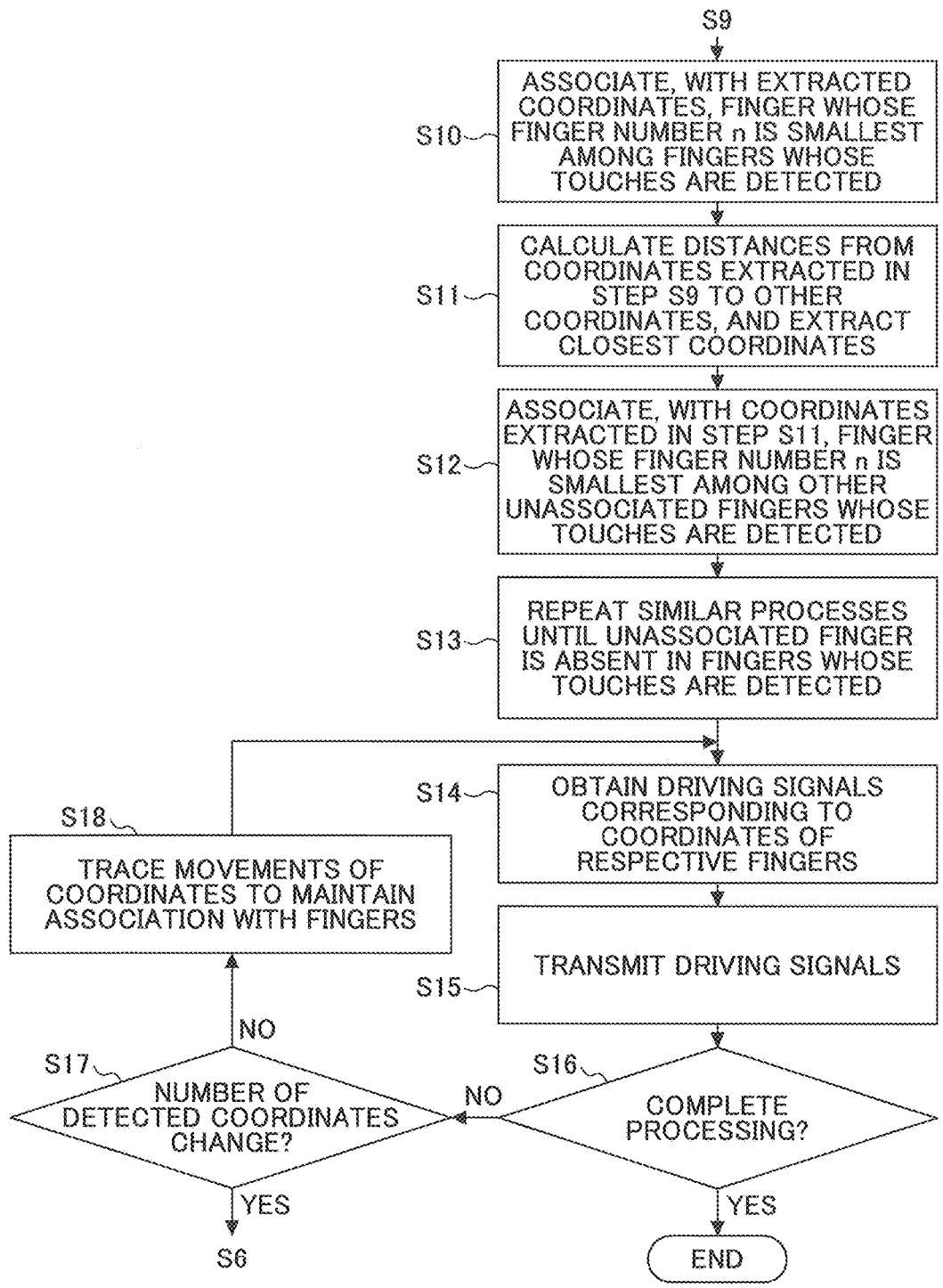

TACTILE SENSATION PROVIDING SYSTEM AND TACTILE SENSATION PROVIDING APPARATUS

CROSS-REFERENCE TO RELATED APPLICATION

This application is a continuation application of International Application PCT/JP2014/082238 filed on Dec. 5, 2014 and designated the U.S., the entire contents of which are incorporated herein by reference.

FIELD

The embodiment discussed herein relates to a tactile sensation providing system and a tactile sensation providing apparatus.

BACKGROUND

Conventionally, there is an input device that is pressed, or brought into contact with or close to a touch panel, for performing an input operation. The input device includes: one or more stimulating electrodes and reference electrodes that can keep a state of contacting with a skin of a living body; and a voltage applying unit that applies, between the stimulating electrodes and the reference electrodes, a voltage for stimulating a tactile sense of the skin contacting with the stimulating electrodes in response to the input operation to the touch panel by the input device (for example, refer to Patent Document 1).

However, the conventional input device is based on a premise that the touch panel is operated by one finger. Thus, in a case where the touch panel is operated by a plurality of fingers, the conventional input device cannot provide tactile senses corresponding to positions of the respective fingers. That is, the conventional input device cannot provide favorable tactile sensations to the plurality of fingers.

RELATED-ART DOCUMENTS

Patent Documents

[Patent Document 1] Japanese Laid-open Patent Publication No. 2010-250750

SUMMARY

According to an aspect of the embodiments, a tactile sensation providing system includes an electronic device; and a first tactile sensation providing apparatus. The electronic device includes a display part; a top panel disposed on a display surface side of the display part, the top panel having a manipulation input surface; a coordinate detector configured to detect coordinates of a position of a manipulation input performed on the manipulation input surface; and a first controlling part. The first tactile sensation providing apparatus includes a wearable part to be worn on a plurality of fingers; a plurality of vibrating elements disposed at respective portions corresponding to pads of the plurality of fingers on which the wearable part is to be worn; a plurality of sensors configured to detect touches of the plurality of respective fingers onto the manipulation input surface; and a second controlling part that is able to perform data communication with the first controlling part. Upon receiving from the second controlling part a report signal representing that a touch of one finger of the plurality of fingers is detected by one sensor of the plurality of sensors, the first controlling part obtains, based on data that represents the one finger whose touch is detected by the one sensor and based on coordinates detected by the coordinate detector, a type of the one finger touching the manipulation input surface and the coordinates where the one finger touches the manipulation input surface, and generates a driving signal that represents a tactile sensation, the tactile sensation corresponding to the data representing the one finger, corresponding to the coordinates where the one finger touches the manipulation input surface, and corresponding to an image displayed on the display part. The second controlling part drives one vibrating element of the plurality of vibrating elements by using the driving signal.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 4A and 4B are diagrams illustrating data that the tactile sensation providing system uses;

FIG. 7 is a flowchart illustrating processing by which the controlling part determines the coordinates of the manipulation input(s);

DESCRIPTION OF EMBODIMENT

Hereinafter, an embodiment to which a tactile sensation providing system and a tactile sensation providing apparatus of the present invention are applied will be described.

[Embodiment]

Figure 1:
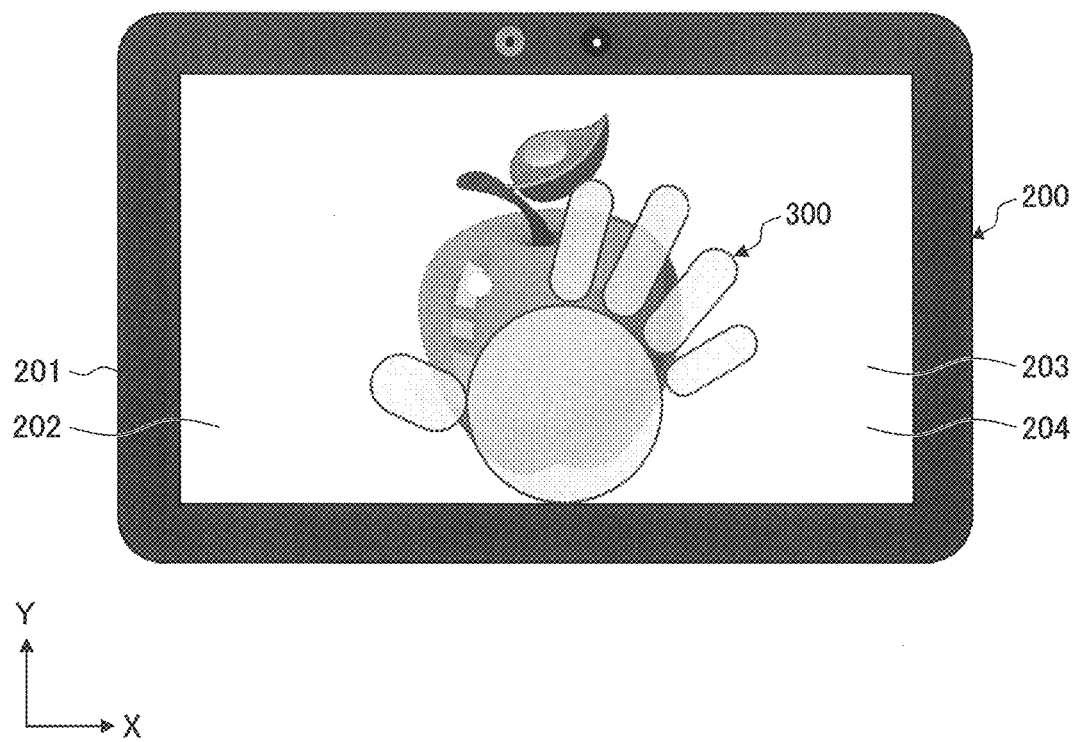
FIG. 1 is a diagram illustrating a tactile sensation providing system according to an embodiment.

FIG. 1 is a diagram illustrating a tactile sensation providing system 100 according to an embodiment. An object in one aspect of the embodiment is to provide a tactile sensation providing system and a tactile sensation providing apparatus that can provide favorable tactile sensations to a plurality of fingers.

The tactile sensation providing system 100 includes an electronic device 200 and a tactile sensation providing apparatus 300.

For example, the electronic device 200 is a smartphone terminal device or a tablet computer that has a touch panel as a manipulation input part. The electronic device 200 may be any device as long as the device has a touch panel as a manipulation input part. Accordingly, the electronic device 200 may be a portable-type information terminal device, a Personal Computer (PC), or the like, for example.

The electronic device 200 includes a housing 201, a display panel 202, a touch panel 203, and a top panel 204. A controlling part, a memory, and the like are arranged inside the housing 201. In plan view as illustrated in FIG. 1, the display panel 202 protrudes from an opening portion of the housing 201, and the touch panel 203 and top panel 204 are disposed on the display panel 202 in this order.

The display panel 202 may be a display part that can display an image. The display panel 202 may be a liquid crystal display panel, an organic Electroluminescence (EL) panel or the like, for example. The display panel 202 is driven and controlled by a controlling part, and displays a GUI manipulation part, an image, characters, symbols, graphics, and/or the like in accordance with an operating state of the electronic device 200.

The touch panel 203 is disposed on the display panel 202. The touch panel 203 is made of a transparent material having a high permeability, and allows an image or the like displayed on the display panel 202 to permeate.

The touch panel 203 is any coordinate detector as long as it can detect a position of a manipulation input on the surface (manipulation input surface) of the top panel 204 performed by a user. The touch panel 203 may be a capacitance type coordinate detector or a resistance film type coordinate detector, for example. It is preferable that the touch panel 203 is a touch panel that can detect, when a plurality of manipulation inputs are performed at the same time, coordinates of all the manipulation inputs.

In a case where the tactile sensation providing system 100 includes one tactile sensation providing apparatus 300 (for one hand), it is preferable that the touch panel 203 can detect coordinates of manipulation inputs at five locations simultaneously. Even when not being able to simultaneously detect the coordinates of the manipulation inputs at five locations, the touch panel 203 may detect coordinates of manipulation inputs of at least two or more locations simultaneously. In such a case, although the number of user's fingertips, to which tactile sensations are provided by the tactile sensation providing apparatus 300, is limited, favorable tactile sensations can be provided with respect to under such limitation The top panel 204 is a transparent panel that is located at the nearest side in FIG. 1. The top panel 204 has a manipulation input surface for when the touch panel 203 is manipulated. The manipulation input surface is located on the uppermost surface of the electronic device 200.

Although the top panel 204 is disposed on the input surface side of the touch panel 203 in the described embodiment, the top panel 204 may be integrated with the touch panel 203. In this case, the surface of the touch panel 203 is equal to the surface of the top panel 204, and the surface of the touch panel 203 constitutes the manipulation input surface. The electronic device 200 may have a configuration in which a top panel 204 is omitted. In this case, the surface of the touch panel 203 constitutes the manipulation input surface.

In a case where the touch panel 203 is of capacitance type, the touch panel 203 may be disposed on the top panel 204. In this case also, the surface of the touch panel 203 constitutes the manipulation input surface.

In FIG. 1, an image of an apple is displayed on the display panel 202 of the electronic device 200.

The tactile sensation providing apparatus 300 is an apparatus that a user wears on his or her hand to use. FIG. 1 illustrates the tactile sensation providing apparatus 300 in a simplified manner. For example, the user wears the tactile sensation providing apparatus 300 on his or her right hand. When the user performs manipulation inputs on the manipulation input surface of the electronic device 200 in a state of wearing the tactile sensation providing apparatus 300 on his or her hand, the tactile sensation providing apparatus 300 provides tactile sensations corresponding to an image at positions where the manipulation inputs are performed.

That is, in a case where an image of an apple is displayed on the electronic device 200 as illustrated in FIG. 1, when the user, wearing the tactile sensation providing apparatus 300 on his or her right hand, touches the image of the apple with right hand finger(s), the tactile sensation providing apparatus 300 vibrates to provide tactile sensation(s) as if the user were touching the surface of the apple. Such tactile sensations can be realized by causing vibrating elements arranged at pads of fingers of the tactile sensation providing apparatus 300 to vibrate.

Next, the tactile sensation providing apparatus 300 will be described in detail with reference to FIGS. 2A and 2B.

Figure 2B:
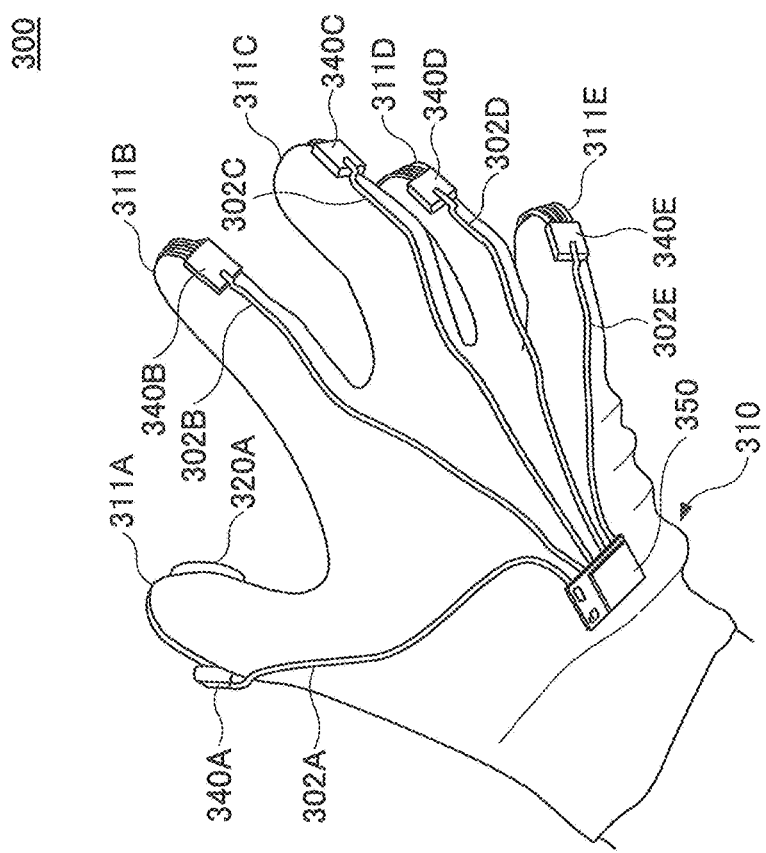
FIGS. 2A and 2B are diagrams illustrating a tactile sensation providing apparatus according to the embodiment.
Figure 2A:
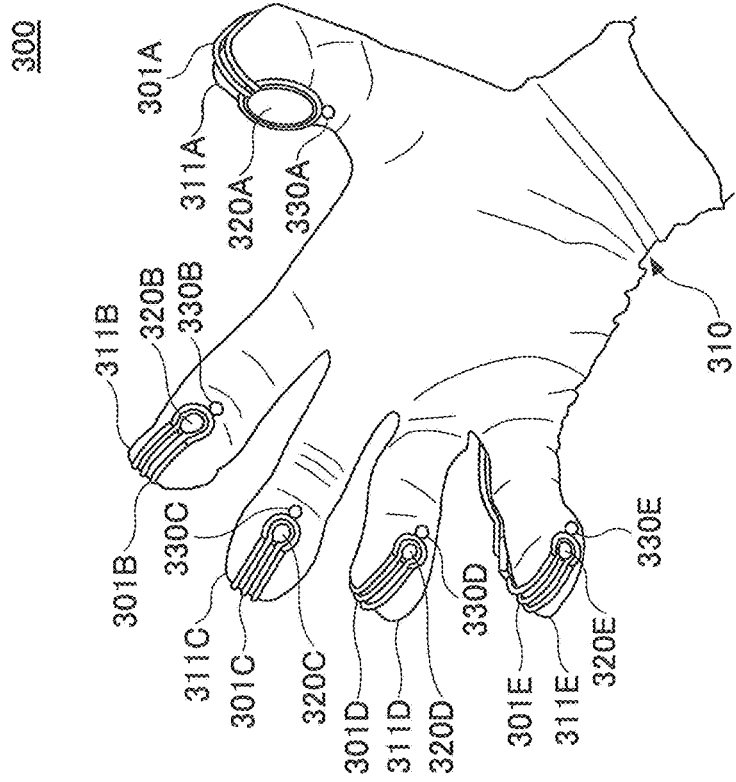

FIGS. 2A and 2B are diagrams illustrating the tactile sensation providing apparatus 300 according to the embodiment. Both FIG. 2A and FIG. 2B illustrate a state in which the user wears the tactile sensation providing apparatus 300 on his or her right hand.

The tactile sensation providing apparatus 300 includes a wearable part 310, five vibrating elements 320A to 320E, five sensors 330A to 330E, five drivers 340A to 340E, and a controlling part 350. The tactile sensation providing apparatus 300 is an example of a first tactile sensation providing apparatus.

Although the tactile sensation providing apparatus 300 illustrated in FIGS. 2A and 2B is for a right hand, the tactile sensation providing apparatus 300 may be for a left hand. The tactile sensation providing apparatus 300 for a left hand has a configuration bilaterally symmetric with respect to the configuration of the tactile sensation providing apparatus 300 for a right hand illustrated in FIGS. 2A and 2B.

Here, although the five vibrating elements 320A to 320E are arranged at different positions, they have configurations similar to each other. Hence, the five vibrating elements 320A to 320E may be simply referred to as the vibrating element(s) 320 unless otherwise distinguished.

Similarly, although the five sensors 330A to 330E are arranged at different positions, they have configurations similar to each other. Hence, the five sensors 330A to 330E may be simply referred to as the sensor(s) 330 unless otherwise distinguished. Further, although the five drivers 340A to 340E are arranged at different positions, they have configurations similar to each other. Hence, the five drivers 340A to 340E may be simply referred to as the driver(s) 340 unless otherwise distinguished.

For example, the wearable part 310 has a glove shape. The wearable part 310 includes finger parts 311A to 311E into which a thumb, an index finger, a middle finger, a ring finger, and a little finger are respectively inserted. For example, the wearable part 310 is made of resin such as vinyl chloride. Note that the finger parts 311A to 311E may be simply referred to as the finger part(s) 311 unless otherwise distinguished.

The user uses the wearable part 310 to wear the vibrating elements 320, the sensors 330, the drivers 340, and the controlling part 350 on his or her hand. The wearable part 310 is not limited to having a glove shape but may have a shape so that the five vibrating elements 320 and the five sensors 330 can be respectively worn on portions of the user's five pads of the fingers.

The vibrating elements 320A to 320E are respectively attached to finger pad portions of the finger parts 311A to 311E. Sizes of the vibrating elements 320A to 320E are equal to each other in plan view. The sizes of the vibrating elements 320A to 320E may be substantially equal to or smaller than sizes of the user's pads of the fingers in plan view.

The vibrating elements 320A to 320E are respectively coupled to the drivers 340A to 340E via wires 301A to 301E. Further, the vibrating elements 320A to 320E are coupled to the controlling part 350 via wires 302A to 302E, respectively. The vibrating elements 320A to 320E are driven by the drivers 340A to 340E based on driving signals output from the controlling part 350.

Amplitudes and frequencies of the vibrating elements 320A to 320E are determined by the driving signals. The amplitudes of the driving signals are set in accordance with tactile sensations of an object represented by an image displayed on the display panel 202 of the electronic device 200.

Frequencies of the driving signals may be frequencies in an audible range or frequencies in an ultrasound frequency band. Here, for example, the audible range is a frequency band less than about 20 kHz and is a frequency band that can be sensed by humans. The ultrasound frequency band is a frequency band higher than or equal to about 20 kHz, and is a frequency band that cannot be sensed by humans, for example.

It is possible to provide various tactile sensations to the user's fingertips by using driving signals of frequencies in the audible range or in the ultrasound frequency band to drive the vibrating elements 320A to 320E. In particular, when natural vibrations in the ultrasound frequency band are generated by using driving signals in the ultrasound frequency band, a layer of air is interposed between the top panel 204 of the electronic device and the vibrating elements 320A to 320E. The layer of air is provided by a squeeze film effect. Thus, a kinetic friction coefficient on the surface of the top panel 204 is decreased when the user traces the surface with the user's fingers.

A user senses an increase of the kinetic friction force applied to the user's fingertip when the vibration of the natural vibration in the ultrasound frequency band is turned off. As a result, the user senses a grippy or scratchy touch (texture) with the user's fingertip. In this case, the user senses as if a convex portion were present on the surface of the top panel 204 when the surface of the top panel 204 becomes grippy and the kinetic friction force increases. Conversely, a user senses a decrease of the kinetic friction force applied to the user's fingertip when the vibration of the natural vibration in the ultrasound frequency band is turned on. As a result, the user senses a slippery or smooth touch (texture) with the user's fingertip. In this way, the presence of a concave portion can be provided as a tactile sensation.

For example, "The Printed-matter Typecasting Method for Haptic Feel Design and Sticky-band Illusion" (the Collection of papers of the 11th SICE system integration division annual conference (SI2010, Sendai) 174-177, 2010-12) discloses that a person can sense a concavity or a convexity through a change of friction feeling. "Fishbone Tactile Illusion" (Collection of papers of the 10th Congress of the Virtual Reality Society of Japan (September, 2005)) discloses that a person can sense a concavity or a convexity as well.

The sensors 330A to 330E are respectively attached, at the finger pad portions of the finger parts 311A to 311E, adjacent to the vibrating elements 320A to 320E. The sizes of the sensors 330A to 330E are smaller than those of the vibrating elements 320A to 320E in plan view. Therefore, the sensors 330A to 330E are arranged beside the vibrating elements 320A to 320E that are arranged on the centers of the pads of the fingers.

The sensors 330A to 330E respectively detect whether the pad portions at the fingertip side of the finger parts 311A to 311E touch an object.

The sensors 330A to 330E are respectively provided in order to detect, when the user wearing the tactile sensation providing apparatus 300 on his or her hand manipulates the top panel 204 of the electronic device 200, whether the finger parts 311A to 311E touch the top panel 204.

For example, the sensors 330A to 330E may be contact-type or optical sensors that can detect touches onto an object. Upon detecting touches, the sensors 330A to 330E transmit, to the controlling part 350, touch detection signals that represent that the touches are detected.

The sensors 330A to 330E are coupled to the controlling part 350 through the wires 301A to 301E and 302A to 302E. The sensor 330, detecting a touch, outputs, to the controlling part 350, a touch signal that represents the touch.

Note that as well as being used to couple the vibrating elements 320A to 320E and the drivers 340A to 340E, the wires 301A to 301E are also used for coupling of the sensors 330A to 330E. Further, as well as being used to couple the drivers 340A to 340E and the controlling part 350, the wires 302A to 302E are also used for coupling of the sensors 330A to 330E.

Separately from the wires coupling the vibrating elements 320A to 320E, the drivers 340A to 340E, and the controlling part 350, the wires 301A to 301E and 302A to 302E include internal wires that couple the sensors 330A to 330E and the controlling part 350.

The drivers 340A to 340E are respectively coupled to the vibrating elements 320A to 320E via the wires 301A to 301E. Further, the drivers 340A to 340E are coupled to the controlling part 350 via the wires 302A to 302E.

The drivers 340A to 340E drive the vibrating elements 320A to 320E based on driving signals output from the controlling part 350.

When a touch detection signal is input from any of the sensors 330A to 330E, the controlling part 350 transmits, to the electronic device 200, a touch finger signal that represents a finger touching the top panel 204. The controlling part 350 is an example of a second controlling part. Here, touch finger signal(s) is transmitted from the tactile sensation providing apparatus 300 to the electronic device 200 through wireless communication.

Upon receiving a driving signal from the electronic device 200 through the wireless communication, the controlling part 350 uses the driving signal to drive any of the drivers 340A to 340E. The driving signal is generated by the controlling part of the electronic device 200, and includes a type, an amplitude, and a frequency for the vibrating elements 320A to 320E. When the vibrating element 320 corresponding to the user's finger touching the top panel 204 is driven by the controlling part 350 among the vibrating elements 320A to 320E, a tactile sensation corresponding to an image is provided to the user's finger.

Next, hardware configurations of the tactile sensation providing apparatus 300 and the electronic device 200 will be described with reference to FIG. 3 in more detail.

Figure 3:
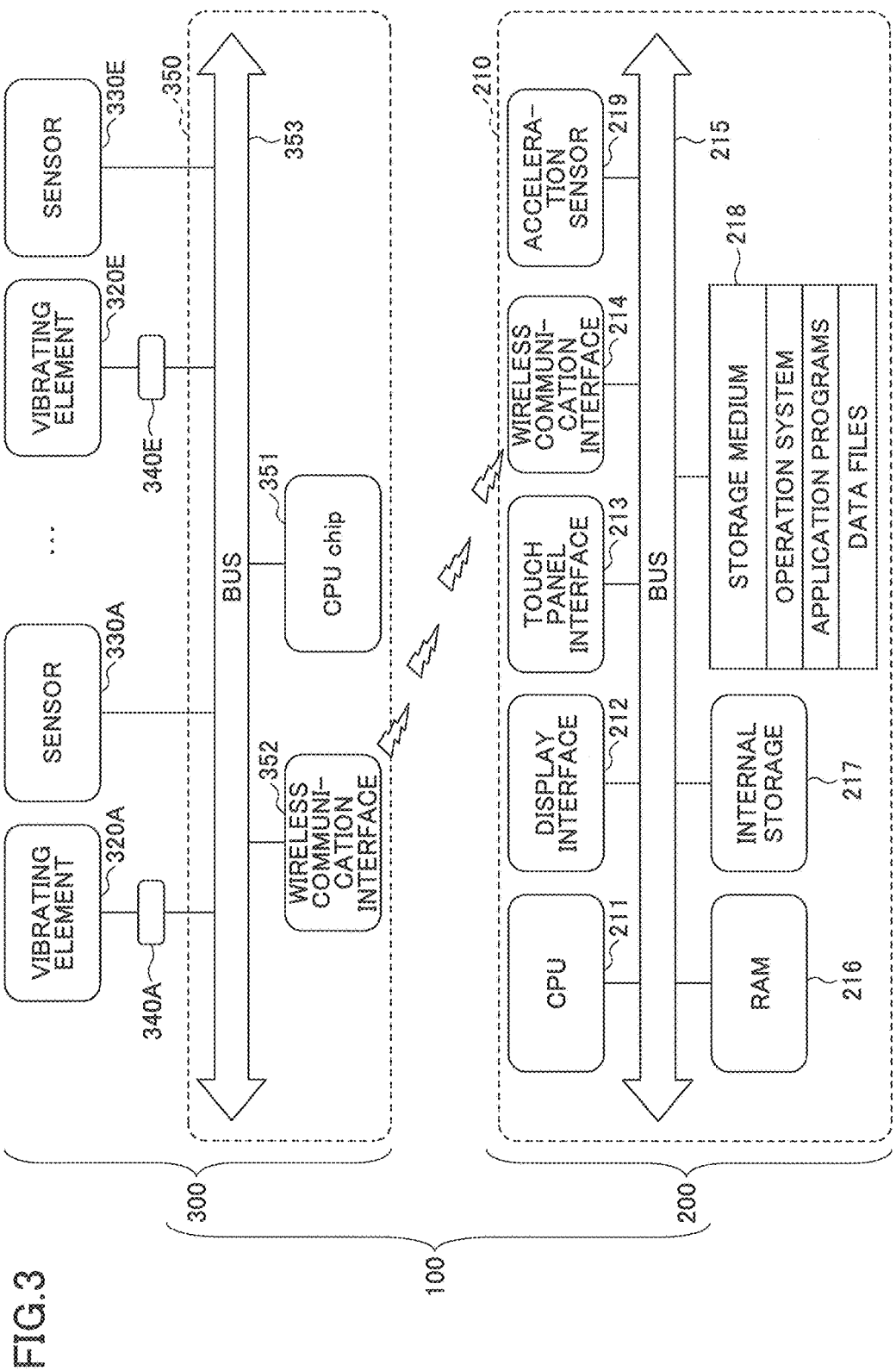
FIG. 3 is a diagram illustrating hardware configurations of the tactile sensation providing apparatus and an electronic device 200 in more detail.

FIG. 3 is a diagram illustrating the hardware configurations of the tactile sensation providing apparatus 300 and the electronic device 200 in more detail. The electronic device 200 and the tactile sensation providing apparatus 300 constitute the tactile sensation providing system 100.

The electronic device 200 includes a controlling part 210. The controlling part 210 is an example of a first controlling part, and includes a Central Processing Unit (CPU) 211, a display interface 212, a touch panel interface 213, a wireless communication interface 214, a bus 215, a Random Access Memory (RAM) 216, an internal storage 217, a storage medium 218, and an acceleration sensor 219. Note that the display panel 202 and the touch panel 203, illustrated in FIG. 1, are respectively coupled to the display interface 212 and the touch panel interface 213.

The CPU 211 is an arithmetic processing unit that performs processing in accordance with an operation of the electronic device 200. The CPU 211 is coupled to the display interface 212, the touch panel interface 213, the wireless interface 214, the RAM 216, the internal storage 217, the storage medium 218, and the acceleration sensor 219 through the bus 215.

The RAM 216 is a main memory of the CPU 211. For example, a program to be executed by the CPU 211 is loaded on the RAM 216. The internal storage 217 is a memory that stores programs and data necessary for the operation of the electronic device 200, and is a rewritable storage medium. The storage medium 218 is a memory that stores an operating system (OS) necessary for the operation of the electronic device 200, application programs, and data files. The acceleration sensor 219 is a sensor that detects an orientation of the electronic device 200. Based on the orientation detected by the acceleration sensor 219, the CPU 211 sets an orientation of an image to be displayed on the display panel 202.

The tactile sensation providing apparatus 300 includes the vibrating elements 320A to 320E, the sensors 330A to 330E, the drivers 340A to 340E, and the controlling part 350. In FIG. 3, the vibrating elements 320A to 320E and the sensors 330A to 330E are illustrated in a simplified manner, and the wires 301A to 301E and 302A to 302E are omitted.

The controlling part 350 includes a CPU chip 351, a wireless communication interface 352, and a bus 353. The CPU chip 351 is coupled, through the bus 353, to the wireless communication interface 352, the sensors 330A to 330E, and the drivers 340A to 340E. Further, the CPU chip 351 is coupled to the vibrating elements 320A to 320E via the drivers 340A to 340E, respectively.

The electronic device 200 and the tactile sensation providing apparatus 300 having such configurations perform data communication via the wireless communication interfaces 214 and 352. Although the embodiment is described here in which the electronic device 200 and tactile sensation providing apparatus 300 communicate data with each other via the wireless communication interfaces 214 and 352, the electronic device 200 and the tactile sensation providing apparatus 300 may be coupled via a Universal Serial Bus (USB) cable to perform wired data communication, for example.

FIGS. 4A and 4B are diagrams illustrating data that the tactile sensation providing system 100 uses.

The data illustrated in FIGS. 4A and 4B are one of data stored, as data files, in the storage medium 218 of the electronic device 200. The data illustrated in FIGS. 4A and 4B are used to generate driving signals.

The data illustrated in FIG. 4A is data that associates Identifications (IDs) of the sensors 330A to 330E with the vibrating elements 320A to 320E. Here, s01 to s05 are assigned, as the IDs, to the sensors 330A to 330E. Further, the vibrating elements 320A to 320E are associated with the IDs s01 to s05 of the sensors 330A to 330E.

Upon receiving a touch finger signal from the tactile sensation providing apparatus 300, the controlling part 210 of the electronic device 200 determines, based on the ID included in the touch finger signal, which of the sensors 330A to 330E touches the top panel 204. Further, the controlling part 210 generates driving signals for driving the vibrating elements 320A to 320E by using the data illustrated in FIG. 4.

FIG. 4B illustrates data that associates image IDs with coordinate data, and driving signal data. The image IDs are assigned to respective images to be displayed on the display panel 202 of the electronic device 200. FIG. 4B illustrates img01, img02, . . . as the image IDs.

The coordinate data represents coordinates of the touch panel 203 in the XY coordinate system in plan view. For example, one of the four vertices of the touch panel 203, having a rectangular shape in plan view, is defined as the origin O of the XY coordinate system, the X axis is set to the long side direction, and the Y axis is set to the short side direction. FIG. 4B illustrates C1(X,Y) and C2(X,Y) as the coordinate data.

The driving signal data includes an amplitude A and a frequency f of vibrating the vibrating element 320 for when a point of coordinates (X,Y) of the manipulation input surface of the top panel 204 is touched. The driving signal data is data in functional form that includes amplitudes A and frequencies f for respective coordinates represented by the coordinate data. FIG. 4B illustrates D1 (A1,f1), D2 (A2,f2), . . . as the driving signal data.

The coordinate data and the driving signal data as described above are associated with the respective image IDs. Accordingly, when an image ID and coordinates are determined, an amplitude and a frequency are determined by the driving signal data.

Figure 5A:
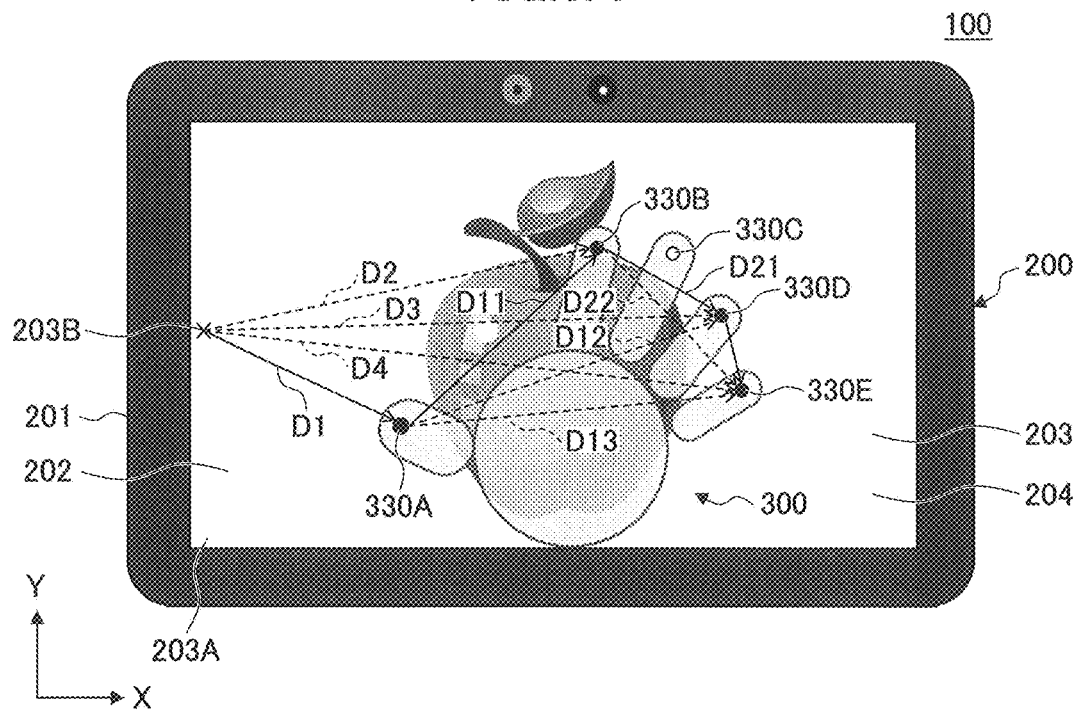
FIGS. 5A and 5B are diagrams that describe methods of associating a user's fingers touching a top panel through the tactile sensation providing apparatus with coordinates detected by a touch panel in the tactile sensation providing system.
Figure 5B:
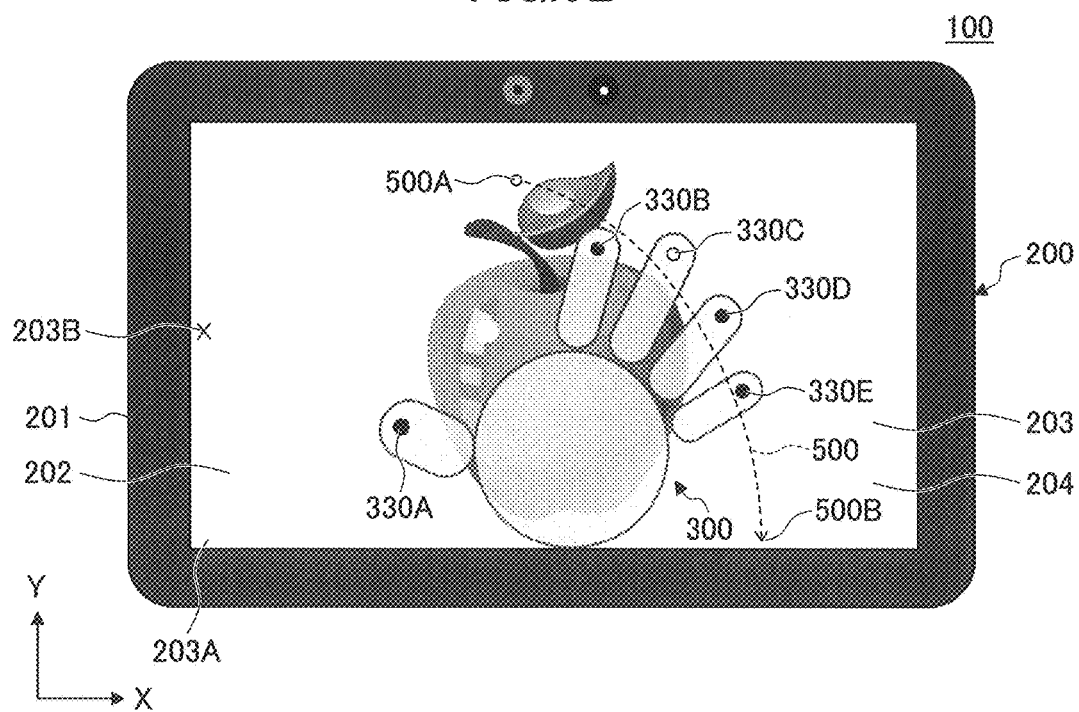

FIGS. 5A and 5B are diagrams that describe methods of associating a user's fingers touching the top panel 204 through the tactile sensation providing apparatus 300 with coordinates detected by the touch panel 203 in the tactile sensation providing system 100. First, the method illustrated in FIG. 5A will be described.

The electronic device 200 defines coordinates by using XY coordinates, in which the lower left vertex 203A of the touch panel 203 is the origin. The X axis extends in a longitudinal direction of the touch panel 203 having a rectangular shape in plan view. The Y axis extends in a short-side direction. Further, the electronic device 200 defines, as a reference point 203B for determining types of fingers touching the top panel 204, a center point of the short side of the touch panel 203 on the Y axis.

For example, when the length of the touch panel 203 in the X axis direction is a (mm) and the length of the touch panel 203 in the Y axis direction is β (mm), coordinates (X,Y) of the origin 203A are (0,0), and coordinates (X,Y) of the reference point 203B are (0,β/2).

Here, the reference point 203B is located at the left end of the touch panel 203 in the X axis direction and the tactile sensation providing apparatus 300 is for a right hand. Therefore, when the tactile sensation providing apparatus 300 touches the manipulation input surface of the electronic device 200 as illustrated in FIGS. 5A and 5B, a finger closest to the reference point 203B is the thumb and a finger farthermost from the reference point 203 is the little finger.

The following example assumes that the user wearing the tactile sensation providing apparatus 300 on his or her right hand manipulates the manipulation input surface of the electronic device 200 with four fingers at the same time. In FIGS. 5A and 5B, only the sensors 330A to 330E are transparently illustrated for the convenience of description. Sensors in contact are indicated by black circles and a sensor not in contact is indicated by a white circle.

That is, in FIGS. 5A and 5B, manipulation input(s) are performed at the same time by the user's four fingers that are the thumb, the index finger, the ring finger, and the little finger. Thus, touch finger signals of the sensors 330A, 330B, 330D, and 330E are transmitted from the tactile sensation providing apparatus 300 to the electronic device 200.

In a case where the electronic device 200 simultaneously receives the four touch finger signals, the touch panel 203 also simultaneously detects four coordinates.

The four coordinates detected by the touch panel 203 are associated with positions of the thumb, the index finger, the ring finger, and the little finger as follows.

First, distances from the reference point 203B to the four coordinates detected by the touch panel 203 are obtained. Here, the distances D1, D2, D3, and D4 from the reference point 203B to the thumb, the index finger, the ring finger, and the little finger are obtained.

Because the reference point 203B is located at the left end of the touch panel 203 in the X direction, the position corresponding to the shortest distance among the distances D1 to D4 is determined as the position of the thumb.

In a case where a relationship of D2<D3<D4 is satisfied with respect to the index finger, the ring finger, and the little finger, the positions of the index finger, the ring finger, and the little finger may be determined in the order of distance from shortest to longest. In a case where such a relationship is not necessarily satisfied, the positions of the index finger, the ring finger, and the little finger may be determined as follows.

The controlling part 210 obtains the distances D11, D12 and D13 from the coordinates of the thumb to the coordinates of the other three points. Then, the controlling part 210 determines, as the position of the index finger, the position corresponding to the shortest distance among the distances D11 to D13. This is because the index finger is closest to the thumb among the index finger, the ring finger, and the little finger.

Then upon determining the coordinates of the index finger, the controlling part 210 obtains the distances D21 and D22 from the coordinates of the index finger to the coordinates of the other two points. Then, the controlling part 210 determines, as the position of the ring finger, the position corresponding to the shorter distance among the distances D21 and D22. This is because the ring finger is closer to the index finger among the ring finger and the little finger.

Then, the controlling part 210 may determine the last coordinates as the coordinates of the little finger.

As described above, it is possible to associate the user's fingers touching the top panel 204 through the tactile sensation providing apparatus 300 with the coordinates detected by the touch panel 203.

When the types of the four fingers touching the top panel 204 can be associated with the four coordinates detected by the touch panel 203, driving signals corresponding to the coordinates of the respective fingers can be obtained by using the data illustrated in FIG. 4B.

Accordingly, through the above described processing, the controlling part 210 associates types of the sensors 330 corresponding to the user's fingers touching the top panel 204 with coordinates detected by the touch panel 203, and uses the data illustrated in FIG. 4B to obtain driving signals corresponding to the coordinates of the respective fingers. Then, the controlling part 210 selects the vibrating elements 320 corresponding to the sensors 330 corresponding to the respective fingers based on the data illustrated in FIG. 4A, and transmits the driving signals to the drivers 340 corresponding to the selected vibrating elements 320.

According to such processing, tactile sensations corresponding to the image can be provided to the user's fingers touching the top panel 204.

Although the method of specifying coordinates on which manipulation inputs are performed by using the tactile sensation providing apparatus 300 for a right hand is described, the tactile sensation providing apparatus 300 for a left hand may be used. In this case, the coordinates (X,Y) of the reference point 203B is set to be (α,β/2).

When the tactile sensation providing apparatus 300 for a left hand is used, the coordinates (X,Y) of the reference point 203B may be set to be (0,β/2), and the coordinates closest to the reference point 203B may be determined in the order of starting from the little finger.

When the electronic device 200 is rotated by 90 degrees in the counterclockwise direction from the landscape orientation illustrated in FIG. 5 in the case where the tactile sensation providing apparatus 300 for a right hand is used, coordinates of each finger may be determined, in a way similar to the above described way, by setting the coordinates (X,Y) of the reference point 203B to be (α/2,β).

When the electronic device 200 is rotated by 90 degrees in the clockwise direction from the landscape orientation illustrated in FIG. 5 in the case where the tactile sensation providing apparatus 300 for a right hand is used, coordinates of a manipulation input of each finger may be determined, in a way similar to the above described way, by setting the coordinates (X,Y) of the reference point 203B to be (α/2,0).

Note that after the determination of the coordinates of the thumb, a circular arc 500, whose center is the coordinates of the thumb, may be drawn in the clockwise direction as illustrated in FIG. 5B so that the index finger, the ring finger, and the little finger are detected in the order of from shortest distance from the circular arc 500 of from the start point 500A to the end point 500B to longest. The radius of such a circular arc 500 may be set to be about 5 cm to 10 cm based on an average size of a person's hand, for example. Alternatively, instead of the circular arc 500, a Bezier curve or the like may be applied to detect the index finger, the ring finger, and the little finger. In a case of detecting left hand fingers, a circular arc may be drawn in the clockwise direction to detect the left hand fingers after detecting the coordinates of the left hand thumb.

Next, a method of determining coordinates of manipulation input(s) by the controlling part 210 will be described with reference to FIG. 6 and FIG. 7.

Figure 6:
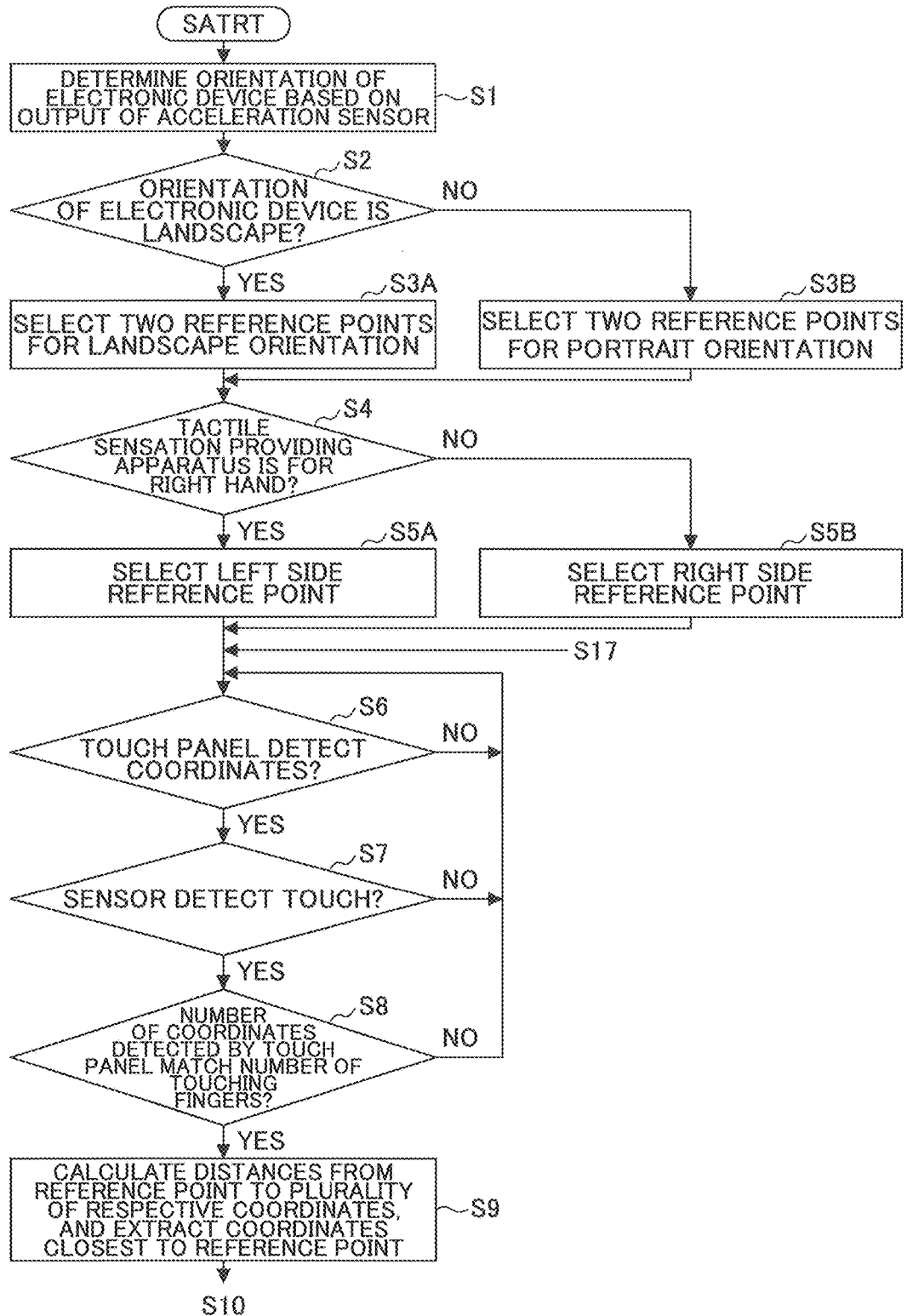
FIG. 6 is a flowchart illustrating processing by which a controlling part determines coordinates of manipulation input(s)

FIG. 6 and FIG. 7 illustrate a flowchart of processing by which the controlling part 210 determines the coordinates of manipulation input(s).

When the electronic device 200 is powered on, or an application program is executed, the controlling part 210 starts the processing.

First, the controlling part 210 determines an orientation of the electronic device 200 based on an output of the acceleration sensor 219 in step S1. The electronic device 200 determines, based on the output of the acceleration sensor 219, which side of the rectangle display panel 202 is located as the upper side in the displayed image.

The controlling part 210 determines whether the orientation of the electronic device 200 is landscape in step S2. As illustrated in FIGS. 5A and 5B, when the orientation is landscape, the long side of the display panel 202, having a rectangular shape in plan view, is located as the upper side in the displayed image. Further, when the electronic device 200 illustrated in FIGS. 5A and 5B is rotated by 180 degrees to switch the positions of the two long sides, the orientation is also landscape. When being rotated by 90 degrees with respect to the land scape orientation, the orientation is portrait.

Upon determining that the orientation of the electronic device 200 is landscape, (YES in step S2), the controlling part 210 selects two reference points for landscape orientation in step S3A. The two reference points for landscape orientation are the reference point 203B illustrated in FIGS. 5A and 5B, whose (X,Y) is (0,β/2), and a reference point, whose (X,Y) is (α, β/2).

In contrast, upon determining that the orientation of the electronic device 200 is not landscape (NO in step S2), the controlling part 210 selects two reference points for portrait orientation in step S3B. The two reference points for portrait orientation are a reference point whose (X,Y) is (α/2,β), and a reference point whose (X,Y) is (α/2,0).

The controlling part 210 determines whether the tactile sensation providing apparatus 300 is for a right hand in step S4. The determination of step S4 may be made by storing in advance, in the storage medium 218, data that represents as to whether the tactile sensation providing apparatus 300 is for a right hand or a left hand and reading the data by the controlling part 210.

Upon determining that the tactile sensation providing apparatus 300 is for a right hand (YES in step S4), the controlling part 210 selects a left side reference point in step S5A. The left side means a left side with respect to the display panel 202. For example, in a case where the electronic device 200 is in a landscape orientation as illustrated in FIGS. 5A and 5B, the controlling part 210 selects the reference point 203B whose (X,Y) is (0,β/2) illustrated in FIGS. 5A and 5B.

In contrast, upon determining that the tactile sensation providing apparatus 300 is not for a right hand (NO in step S4), the controlling part 210 selects a right side reference point in step S5B. The right side means a right side with respect to the display panel 202. For example, in a case where the electronic device 200 is in a landscape orientation as illustrated in FIGS. 5A and 5B, the controlling part 210 selects the reference point whose (X,Y) is (α,β/2) illustrated in FIGS. 5A and 5B.

The controlling part 210 determines, based on an output signal of the touch panel 203, whether coordinates are detected in step S6. The process of step S6 is repeatedly executed until the coordinates are detected.

The controlling part 210 determines whether a touch is detected by the sensor 330 in step S7. Specifically, the controlling part 210 may determine whether a touch finger signal of the sensor 330 is received from the tactile sensation providing apparatus 300 to perform the process of step S7.

Note that upon determining that the touch is not detected by the sensor 330, the controlling part 210 returns the flow to step S6.

Upon determining that the touch is detected by the sensor 330 (YES in step S7), the controlling part 210 determines whether the number of coordinates detected by the touch panel 203 matches the number of touches detected by the sensors 330 in step S8.

Upon determining that the number of coordinates does not match the number of touches (NO in step S8), the controlling part 210 returns the flow to step S6.

Upon determining that the number of coordinates matches the number of touches (YES in step S8), the controlling part 210 calculates distances from the reference point to the plurality of respective coordinates detected by the touch panel 203 to extract the coordinates closest to the reference point in step S9.

The controlling part 210 associates in step S10 a finger, whose finger number n is smallest among the plurality of fingers whose touches are detected by the sensors 330, with the coordinates extracted in step S9.

Here, for example, the finger number is a number representing a n-th finger (n=1 to 5) in a case where the numbers are assigned to first to fifth fingers in order of from the thumb. The finger numbers correspond to the IDs s01 to s05 of the sensors 330A to 330E illustrated in FIG. 4A.

In step S11, the controlling part 210 calculates distances from the coordinates extracted in step S9 to the other coordinates, to extract the coordinates closest to the coordinates extracted in step S9.

In step S12, the controlling part 210 associates, with the coordinates extracted in step S11, a finger whose finger number n is smallest among the other fingers, having not been associated with coordinates yet, whose touches are detected by the sensors 330.

In a case where a finger having not yet been associated with coordinates, whose touch is detected by the sensor 330, is present, processes similar to the processes of steps S11 and S12 are performed to associate the finger with the coordinates in step S13.

In a case where the number of fingers whose touches are detected by the sensors 330 is two, associating processing is completed in the processes of steps S9 to S12. In this case, the controlling part 210 causes the flow to proceed to step S14 without performing the process of step S13.

The controlling part 210 obtains, for the respective fingers for which association with the coordinates is completed, driving signals corresponding to the coordinates in step S14.

The controlling part 210 transmits the driving signals to the tactile sensation providing apparatus 300 in step S15.

In this way, tactile sensations corresponding to the image located at the coordinates of the respective fingers whose touches are detected by the sensors 330 are provided to the user's fingertips.

The controlling part 210 determines in step S16 whether to complete the processing. For example, when the power source of the electronic device 200 is powered off, or the application program is completed, the processing is completed.

Upon determining not to complete the processing (NO in step S16), the controlling part 210 determines whether the number of coordinates detected by the touch panel 203 changes in step S17. In a case where the number of coordinates detected by the touch panel 203 changes, it is necessary to change the driving signals because contents of the manipulation inputs by the user are changed.

Upon determining that the number of coordinates detected by the touch panel 203 changes (YES in step S17), the controlling part 210 returns the flow to step S6.

Upon determining that the number of coordinates detected by the touch panel 203 does not change (NO in step S17), the controlling part 210 traces movements of the coordinates based on the output of the touch panel 203 to keep the association of the moving coordinates with the fingers in step S18.

Upon completing the process of step S18, the controlling part 210 returns the flow to step S14. In this way, the driving signals are generated for the coordinates after the movements, and tactile sensations corresponding to the image are provided.

Note that upon determining to complete the processing (YES in step S16), the controlling part 210 completes the series of processes.

According to the processing described above, the tactile sensations corresponding to the image present at the touched positions on the manipulation input surface of the electronic device 200 are provided to the fingertips of the user putting the tactile sensation providing apparatus 300 on his or her hand.

Figure 8A:
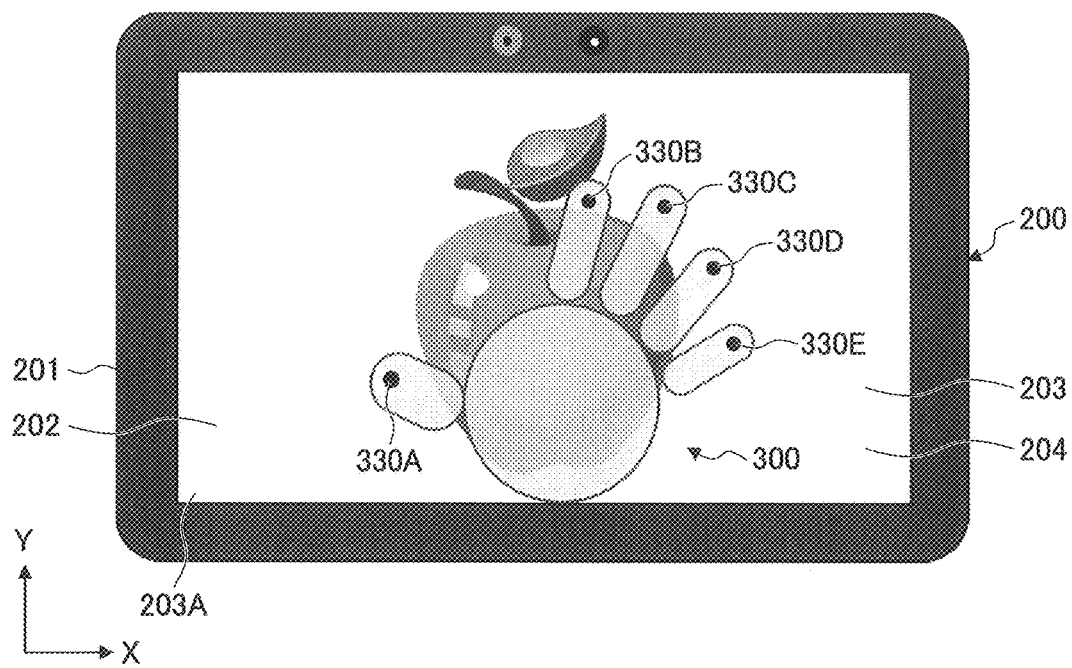
FIGS. 8A and 8B are diagrams that describe a change of tactile sensations provided to a user in a case where the user's hand wearing the tactile sensation providing apparatus is moved.
Figure 8B:
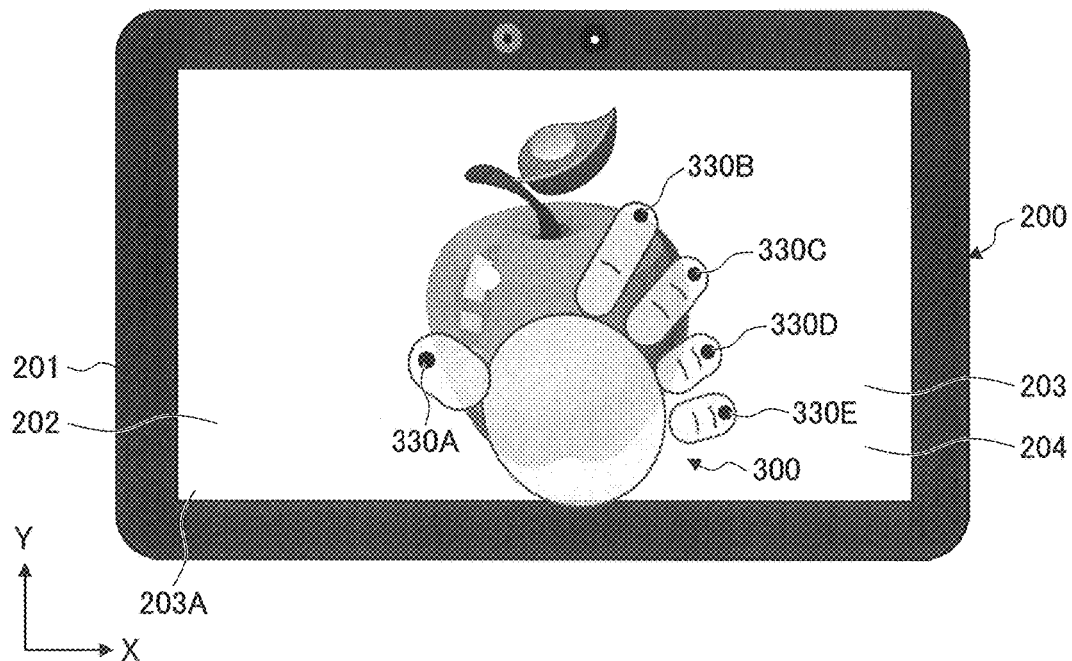

FIGS. 8A and 8B are diagrams illustrating a change of tactile sensations provided to the user in a case where the user's hand wearing the tactile sensation providing apparatus 300 is moved.

In the state illustrated in FIG. 8A, the right hand fingers of the user wearing the tactile sensation providing apparatus 300 touches the manipulation input surface of the electronic device 200. Thus, all the sensors 330A to 330E are indicated by black circles in FIG. 8A.

At this time, the sensor 330B is reaching the edge of the image of the apple, but the sensors 330A, and 330C to 330E do not touch the image of the apple. Hence, only the vibrating element 320B (refer to FIGS. 5A and 5B) corresponding to the sensor 330B is driven to provide, to the user, a tactile sensation of touching the apple.

When the user moves his or her right hand as illustrated in FIG. 8B to enter a state in which the sensors 330A to 330C touches the apple and the sensors 330D and 330E do not touch the apple, the vibrating elements 320A to 320C (refer to FIGS. 5A and 5B) corresponding to the sensors 330A to 330C are driven to provide, to the user, tactile sensations (simulated three-dimensional feeling) of touching the apple.

As described above, by using the tactile sensation providing system 100, in accordance with positions of respective fingers of a user's hand wearing the tactile sensation providing apparatus 300 and with an image corresponding to the positions of the user's fingers, tactile sensations as if the user were actually touching an object represented by the image are provided to the user.

Without vibrating the electronic device 200, the tactile sensation providing system 100 can provide the tactile sensations in accordance with the image touched by the fingertips of the user wearing the tactile sensation providing apparatus 300 on his or her hand.

Further, more realistic tactile sensations can be provided through the respective fingers because the vibrating elements 320A to 320E corresponding to the respective fingers are driven by driving signals that are different from each other.

Further, vibrations are easily transmitted to the user's fingertips because the vibrating elements 320A to 320E of the tactile sensation providing apparatus 300 worn on the user's hand are driven. Further, in a case where the wearable part 310 covers the surfaces of the vibrating elements 320A to 320E, by using a hard material for the covering portion, amplitude attenuation of the vibrations can be reduced and stronger tactile sensations can be provided.

Further, by using a material whose Young's modulus is high for the top panel 204 of the electronic device 200, or by integrating the top panel 204 and the touch panel 203 without providing a clearance gap between the top panel 204 and the touch panel 203, a reaction force that the tactile sensation providing apparatus 300 receives from the top panel 204 can be increased and stronger tactile sensations can be provided.

Images to be displayed by the tactile sensation providing system 100 as described above may be various images. Tactile sensations corresponding to the various images may be provided by preparing in advance image data and driving signals. For example, by preparing driving signals corresponding to various images such as images of various characters of games or the like, images of photographs of animals and plants, images of photographs of art objects or the like, the tactile sensation providing system 100 can be used in various scenes.

As described above, according to the embodiment, it is possible to provide the tactile sensation providing system 100 and the tactile sensation providing apparatus 300 that can provide favorable tactile sensations to a plurality of fingers.

Note that the tactile sensation providing apparatus 300 may be driven as follows. In a case where the user's right hand moves to the positions of FIG. 8B from the positions of FIG. 8A, with respect to the state of FIG. 8A, the tactile sensation providing apparatus 300 is driven to decrease the amplitude of the driving signal that drives the vibrating element 320B corresponding to the sensor 330B, and to increase the amplitudes of the driving signals that drive the vibrating elements 320A and 320C to 320E corresponding to the sensors 330A and 320C to 320E.

In this way, the kinetic friction force applied to the index finger increases and the kinetic friction force applied to the thumb, the middle finger, the ring finger, and the little finger decreases.

Then, when the user moves his or her right hand to enter the state as illustrated in FIG. 8B in which the sensors 330A to 330C touch the apple and the sensors 330D and 330E do not touch the apple, the amplitudes of the driving signals that drive the vibrating elements 320A to 320C corresponding to the sensors 330A to 330C are decreased and the amplitudes of the driving signals that drive the vibrating elements 320D and 320E corresponding to the sensors 330D and 330E are increased.

By driving the vibrating elements 320 in such a way, a convex feeling can be provided to the thumb and the middle finger when reaching the edge of the apple because the kinetic friction force changes from a small state to a large state.

Especially, by driving the vibrating elements 320A to 320E so that natural vibrations in the ultrasound frequency band are generated, such a convex feeling can be provided more notably through the squeeze film effect.

The amplitudes may be changed through a pattern that is a reverse pattern of that described above.

Here, another method of associating the user's fingers touching the top panel 204 with coordinates detected by the touch panel 203 will be described with reference to FIG. 9.

Figure 9:
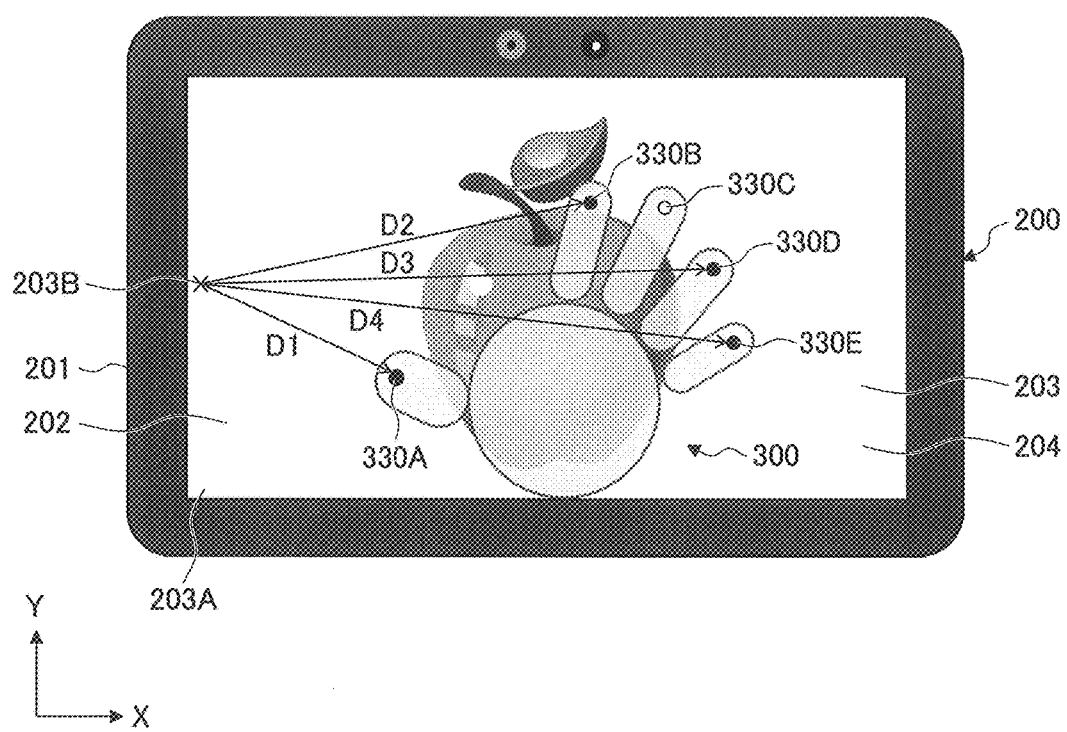
FIG. 9 is a diagram that describes another method of associating a user's fingers touching the top panel through the tactile sensation providing apparatus with coordinates detected by the touch panel in the tactile sensation providing system.

FIG. 9 is a diagram that describes another method of associating the user's fingers touching the top panel 204 through the tactile sensation providing apparatus 300 with coordinates detected by the touch panel 203 in the tactile sensation providing system 100.

The electronic device 200 defines coordinates by using XY coordinates, in which the lower left vertex 203A of the touch panel 203 is the origin. The X axis extends in a longitudinal direction of the touch panel 203 having a rectangular shape in plan view. The Y axis extends in a short-side direction. Further, the electronic device 200 defines, as a reference point 203B for determining types of fingers touching the top panel 204, a center point of the short side of the touch panel 203 on the Y axis.

For example, when the length of the touch panel 203 in the X axis direction is α (mm) and the length of the touch panel 203 in the Y axis direction is β (mm), coordinates (X,Y) of the origin 203A are (0,0), and coordinates (X,Y) of the reference point 203B are (0,β/2).

Here, the reference point 203B is located at the left end of the touch panel 203 in the X axis direction and the tactile sensation providing apparatus 300 is for a right hand. Therefore, when the tactile sensation providing apparatus 300 touches the manipulation input surface of the electronic device 200 as illustrated in FIG. 9, a finger closest to the reference point 203B is the thumb and a finger farthermost from the reference point 203 is the little finger.

For example, it is assumed that the user wearing the tactile sensation providing apparatus 300 on his or her right hand manipulates the manipulation input surface of the electronic device 200 with four fingers at the same time. In FIG. 9, only the sensors 330A to 330E are transparently illustrated for the convenience of description. Sensors in contact are indicated by black circles and an sensor not in contact is indicated by a white circle.

That is, in FIG. 9, manipulation inputs are performed at the same time by the user's four fingers that are the thumb, the index finger, the ring finger, and the little finger. Thus, touch finger signals of the sensors 330A, 330B, 330D, and 330E are transmitted from the tactile sensation providing apparatus 300 to the electronic device 200.

In a case where the electronic device 200 simultaneously receives the four touch finger signals, the touch panel 203 also simultaneously detects four coordinates.

The four coordinates detected by the touch panel 203 are associated with positions of the thumb, the index finger, the ring finger, and the little finger as follows.

First, distances from the reference point 203B to the four coordinates detected by the touch panel 203 are obtained. Here, the distances are D1, D2, D3, and D4 in the order of distance from shortest to longest. That is, a relationship of D1<D2<D3<D4 is satisfied.

Thus, it is found that the coordinates closest to the reference point 203B are the coordinates of the thumb, and it is found that the coordinates of the index finger, the ring finger, and the little finger are farther from the reference point 203B in the order of the index finger, the ring finger, and the little finger.

As described above, it is possible to associate the user's fingers touching the top panel 204 through the tactile sensation providing apparatus 300 with the coordinates detected by the touch panel 203.

When the types of the four fingers touching the top panel 204 can be associated with the four coordinates detected by the touch panel 203, driving signals corresponding to the coordinates of the respective fingers can be obtained by using the data illustrated in FIG. 4B.

Accordingly, through the above described processing, the controlling part 210 associates types of the sensors 330 corresponding to the user's fingers touching the top panel 204 with the coordinates detected by the touch panel 203, and uses the data illustrated in FIG. 4B to obtain the driving signals corresponding to the coordinates of the respective fingers. Then, the controlling part 210 selects the vibrating elements 320 corresponding to the sensors 330 corresponding to the respective fingers based on the data illustrated in FIG. 4A, and transmits the driving signals to the drivers 340 corresponding to the selected vibrating elements 320.

According to such processing, tactile sensations corresponding to the image can be provided to the user's fingers touching the top panel 204.

As described above, according to the embodiment illustrated in FIG. 9, it is possible to provide the tactile sensation providing system 100 and the tactile sensation providing apparatus 300 that can provide favorable tactile sensations to a plurality of fingers.

Figure 10:
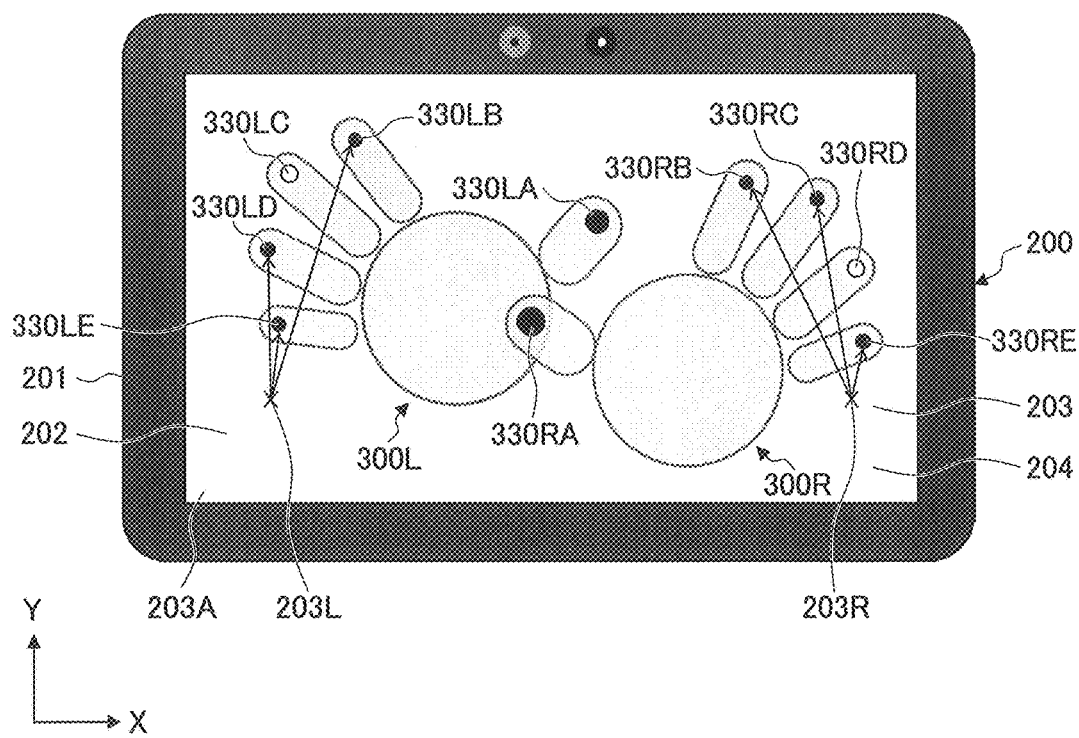
FIG. 10 is a diagram illustrating a tactile sensation providing system according to a variation example of the embodiment.

FIG. 10 is a diagram illustrating a tactile sensation providing system 100A according to a variation example of the embodiment. The tactile sensation providing system 100A includes the electronic device 200 and tactile sensation providing apparatuses 300R and 300L. The tactile sensation providing apparatus 300R is for a right hand and the tactile sensation providing apparatus 300L is for a left hand.

The tactile sensation providing apparatus 300R includes vibrating elements 320RA to 320RE and sensors 330RA to 330RE. In addition to these, the tactile sensation providing apparatus 300R includes a wearable part, drivers, and a controlling part that are respectively similar to the wearable part 310, the drivers 340A to 340E, and the controlling part 350 (refer to FIGS. 2A and 2B), but they are omitted in FIG. 10.

The vibrating elements 320RA to 320RE and the sensors 330RA to 330RE are respectively similar to the vibrating elements 320A to 320E and the sensors 330A to 330E that are illustrated in FIGS. 2 and 5, but the size of the vibrating element 320RA is larger than the size of the vibrating element 320A in plan view. That is, the size in plan view of the vibrating element 320RA is larger than the size of each of the vibrating elements 320RB to 320RE.

The tactile sensation providing apparatus 300L includes vibrating elements 320LA to 320LE and sensors 330LA to 330LE. Because the tactile sensation providing apparatus 300L has a configuration in which the tactile sensation providing apparatus 300R is changed for a left hand, the tactile sensation providing apparatus 300L has a configuration bilaterally symmetric with respect to the configuration of the tactile sensation providing apparatus 300R.

The size of each of the vibrating elements 320LB to 320LE is equal to the size of each of the vibrating elements 320RB to 320RE in plan view. The size of the vibrating element 320LA is larger than the size of each of the vibrating elements 320LB to 320LE, but is smaller than the size of the vibrating element 320RA. Other than the above, the tactile sensation providing apparatus 300L has a configuration similar to that of the tactile sensation providing apparatus 300R.

As illustrated in FIG. 10, when the user wears the respective tactile sensation providing apparatuses 300R and 300L on his or her both hands to perform manipulation input(s) on the manipulation input surface of the electronic device 200 by both hands, there may be a case in which the right hand thumb and the left hand thumb are crossed at a center portion of the touch panel 203 and the right hand thumb is located further toward the left side than the left hand thumb. There may be a case in which the right hand thumb is located further toward the left side than the left hand index finger and vice versa.

In such a case, in order to easily discriminate a manipulation input by the right hand thumb from a manipulation input by the left hand thumb, the tactile sensation providing system 100A is configured such that the vibrating element 320RA corresponding to the right hand thumb, the vibrating element 320LA corresponding to the left hand thumb, and vibrating elements 320RB to 320RE and 320LB to 320LE corresponding to the other fingers of both hands have different sizes in plan view. That is, the vibrating elements 320RA to 320RE and 320LA to 320LE are realized by three types of vibrating elements, whose sizes are different in plan view.

The vibrating element 320RA, the vibrating element 320LA, and the vibrating elements 320RB to 320RE and 320LB to 320LE having different sizes in plan view are used for the following reasons.

This is because the vibrating elements 320RA to 320RE and 320LA to 320LE are arranged at centers of pads of fingers of the wearable part 310 (refer to FIGS. 2A and 2B) and have sizes substantially equal to the sizes of the pads of the fingers, and therefore areas where the user touches the touch panel 203 when manipulating the touch panel 203 are determined by sizes in plan view of the vibrating elements 320RA to 320RE and 320LA to 320LE.

Further, this is because the touch panel 203 calculates an area touched by a user's fingertip when detecting coordinates of a manipulation input.

Accordingly, by making the vibrating element 320 RA corresponding to the right hand thumb, the vibrating element 320LA corresponding to the left hand thumb, and the vibrating elements 320RB to 320RE and 320LB to 320LE corresponding to the other fingers of both hands different in sizes in plan view, a manipulation input by the right hand thumb, a manipulation input by the left hand thumb, and a manipulation input by another finger of both hands can be discriminated from each other based on the area.

By using such vibrating elements 320RA, 320LA, 320RB to 320RE, and 320LB to 320LE, even when the user performs manipulation input(s) on the manipulation input surface of the electronic device 200 by both hands as illustrated in FIG. 10, and the right hand thumb and the left hand thumb are crossed, it is possible to discriminate the coordinates of the right hand thumb from the coordinates of the left hand thumb based on information on the areas detected by the touch panel 203.

Further, coordinates of the other fingers of the right hand can be detected, by using the coordinates of the right hand thumb, in a method similar to the method described with reference to FIGS. 5. At this time, a reference point 203R may be used. In plan view, the reference point 203R is located at a right end side of the touch panel 203 and is located further toward the negative side in the Y axis direction than the center of the length in the Y axis direction.

Further, coordinates of fingers other than the left hand thumb can be detected in a similar method. At this time, a reference point 203L may be used. In plan view, the reference point 203L is located at a left end side of the touch panel 203 and is located further toward the negative side in the Y axis direction than the center of the length in the Y axis direction.

Thus, as illustrated in FIG. 10, even when the user performs the manipulation input(s) by both hands on the manipulation input surface of the electronic device 200, it is possible to associate the respective fingers with the coordinates and to transmit, to the vibrating elements 320RA to 320RE and 320LA to 320LE corresponding to the respective fingers, driving signals corresponding to the image.

As a result, as illustrated in FIG. 10, when the user performs the manipulation input(s) by both hands on the manipulation input surface of the electronic device 200, it is possible to provide the tactile sensations to the user's respective fingers.

As described above, according to the variation example of the embodiment, it is possible to provide the tactile sensation providing system 100A and the tactile sensation providing apparatuses 300R and 300L that can provide favorable tactile sensations to a plurality of fingers.

Note that in the above described embodiment, the size of the vibrating element 320RA corresponding to the right hand thumb, the size of the vibrating element 320LA corresponding to the left hand thumb, and the size of each of the vibrating elements 320RB to 320RE and 320LB to 320LE corresponding to the other fingers of both hands are different from each other in plan view. However, furthermore, the vibrating elements 320RB to 320RE and 320LB to 320LE, corresponding to the other fingers of both hands, may have different sizes in plan view. For example, in a case where the touch panel 203 can discriminate simultaneous manipulation inputs performed on ten locations, the vibrating elements 320RA to 320RE and 320LA to 320LE, corresponding to all fingers, may have different sizes with each other in plan view.

Although examples of a tactile sensation providing system and a tactile sensation providing apparatus electronic device according to the embodiment of the present invention have been described, the present invention is not limited to the embodiment specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A tactile sensation providing system comprising:
an electronic device; and
a first tactile sensation providing apparatus,
wherein the electronic device includes
a display part,
a top panel disposed on a display surface side of the display part, the top panel having a manipulation input surface,
a coordinate detector configured to detect coordinates of a position of a manipulation input performed on the manipulation input surface, and
a first controlling part,
wherein the first tactile sensation providing apparatus includes
a wearable part to be worn on a plurality of fingers,
a plurality of vibrating elements disposed at respective portions corresponding to pads of the plurality of fingers on which the wearable part is to be worn, a plurality of sensors configured to detect touches of the plurality of respective fingers onto the manipulation input surface, and a second controlling part that is able to perform data communication with the first controlling part, wherein, upon receiving from the second controlling part a report signal representing that a touch of one finger of the plurality of fingers is detected by one sensor of the plurality of sensors, the first controlling part obtains, based on data that represents the one finger whose touch is detected by the one sensor and based on coordinates detected by the coordinate detector, a type of the one finger touching the manipulation input surface and the coordinates where the one finger touches the manipulation input surface, and generates a driving signal that represents a tactile sensation, the tactile sensation corresponding to the data representing the one finger, corresponding to the coordinates where the one finger touches the manipulation input surface, and corresponding to an image displayed on the display part, wherein the second controlling part drives one vibrating element of the plurality of vibrating elements by using the driving signal, and wherein in a case where two or more fingers, including a thumb, of the plurality of fingers touch the manipulation input surface, the thumb is specified as touching a position closest to reference coordinates of the surface of the top panel, among two or more positions being touched by the two or more fingers.

2. The tactile sensation providing system according to claim 1, wherein, in a case where touches of two or more fingers of the plurality of fingers are detected by two or more sensors of the plurality of sensors, the first controlling part obtains, based on data that represents the two or more fingers whose touches are detected by the two or more sensors and based on a positional relationship between the reference coordinates of the manipulation input surface and two or more coordinates detected by the coordinate detector, types of the two or more fingers touching the manipulation input surface and the two or more coordinates where the two or more fingers touch the manipulation input surface.

3. The tactile sensation providing system according to claim 2, wherein the reference coordinates are located at a left end side or a right end side of the display part in plan view, and wherein the first controlling part specifies the types of the two or more fingers touching the manipulation input surface based on the data that represents the two or more fingers whose touches are detected by the two or more sensors and based on distances between the reference coordinates and the two or more coordinates detected by the coordinate detector.

4. The tactile sensation providing system according to claim 3, wherein, after specifying a type of a finger closest to the reference coordinates based on the distances between the reference coordinates and the two or more coordinates detected by the coordinate detector, the first controlling part specifies, based on distances between coordinates of the specified finger and other coordinates of the two or more coordinates detected by the coordinate detector, a type of a finger whose touch is detected adjacent to the specified finger.

5. The tactile sensation providing system according to claim 3, wherein, after specifying a type of a finger closest to the reference coordinates based on the distances between the reference coordinates and the two or more coordinates detected by the coordinate detector, the first controlling part obtains, by using coordinates of the specified finger and other coordinates of the two or more coordinates detected by the coordinate detector, a predetermined curve to specify a type of a finger whose touch is detected adjacent to the specified finger along the predetermined curve.

6. The tactile sensation providing system according to claim 1, further comprising:

a second tactile sensation providing apparatus, wherein the first tactile sensation providing apparatus is worn on a user's right hand, wherein the second tactile sensation providing apparatus is worn on the user's left hand, wherein a size of a vibrating element corresponding to a thumb of the first tactile sensation providing apparatus is different from a size of a vibrating element corresponding to a thumb of the second tactile sensation providing apparatus in plan view, and wherein the first controlling part discriminates, based on data representing an area detected by the coordinate detector, a manipulation input by the thumb of the first tactile sensation providing apparatus from a manipulation input by the thumb of the second tactile sensation providing apparatus.

7. A tactile sensation providing apparatus to be worn on a plurality of fingers that perform a manipulation input on a manipulation input surface of an electronic device, the electronic device including a display part, a top panel disposed on a display surface side of the display part and having the manipulation input surface, and a coordinate detector configured to detect coordinates of a position of the manipulation input performed on the manipulation input surface, the tactile sensation providing apparatus, for providing a tactile sensation to one or more fingertips touching the manipulation input surface, comprising;

a wearable part to be worn on the plurality of fingers;

a plurality of vibrating elements disposed at respective portions corresponding to pads of the plurality of fingers on which the wearable part is to be worn;

a plurality of sensors configured to detect touches of the plurality of respective fingers onto the manipulation input surface; and a controlling part configured to drive one vibrating element of the plurality of vibrating elements by using a driving signal that represents a tactile sensation, the tactile sensation corresponding to data, obtained by the electronic device based on data that represents one finger of the plurality of fingers whose touch is detected by one sensor of the plurality of sensors and based on coordinates detected by the coordinate detector, that represents a type of the one finger touching the manipulation input surface, corresponding to the coordinates where the one finger touches the manipulation input surface, and corresponding to an image displayed on the display part, wherein in a case where two or more fingers, including a thumb, of the plurality of fingers touch the manipulation input surface, the thumb is specified as touching a position closest to reference coordinates of the surface of the top panel, among two or more positions being touched by the two or more fingers.

8. A tactile sensation providing system comprising:

an electronic device; and a tactile sensation providing apparatus wearable on a plurality of fingertips of a user, wherein the tactile sensation providing apparatus includes a plurality of vibrating elements disposed at respective portions corresponding to the plurality of fingertips, and a plurality of sensors configured to detect touches of the plurality of respective fingertips onto a surface of a top panel that is included in the electronic device, wherein the electronic device includes a display part configured to display an image, the top panel, and a detector configured to detect, when the surface of the top panel is touched by the plurality of fingertips through the tactile sensation providing apparatus, touched positions with respect to the image, wherein, when the surface of the top panel is touched by the plurality of fingertips through the tactile sensation providing apparatus, the tactile sensation providing system causes the plurality of vibrating elements to vibrate, based on the touched positions detected by the detector and based on the touches detected by the plurality of sensors, to provide, to the plurality of fingertips, tactile sensations corresponding to the touched positions with respect to the image, and wherein in a case where two or more fingers, including a thumb, of the plurality of fingers touch the manipulation input surface, the thumb is specified as touching a position closest to reference coordinates of the surface of the top panel, among two or more positions being touched by the two or more fingers.

* * * * *